J. J. JONES & S. H. DWIGHT.
Improvement in Corn-Planters.
No. 128,888. Patented July 9, 1872.
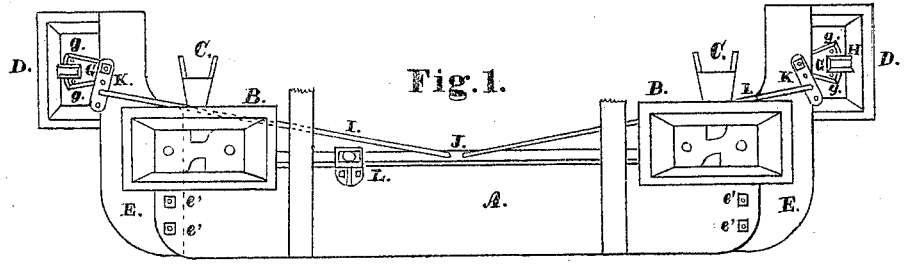
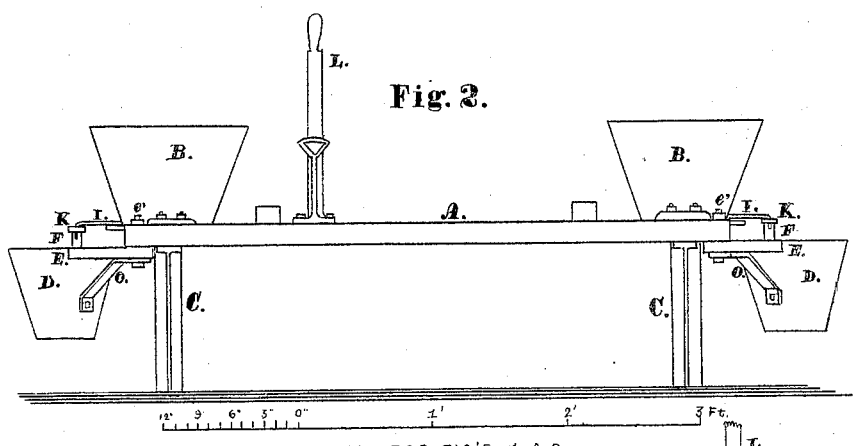
SCALE FOR FIG'S 1, & 2.
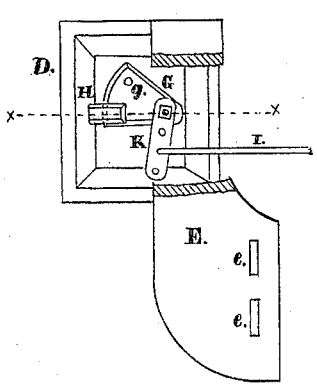
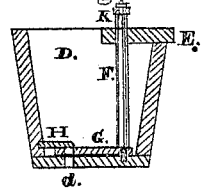
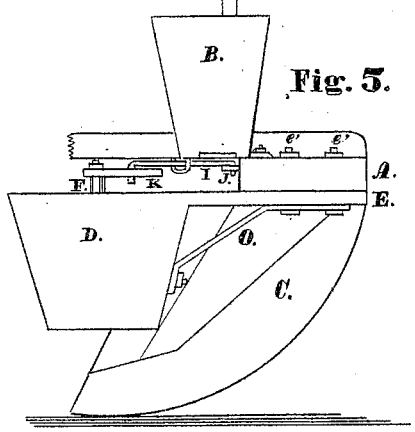
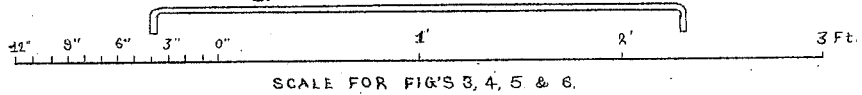
SCALE FOR FIG'S 3, 4, 5 & 6.
WITNESSES:
J. L. Charni
Robert R. Montgomery
INVENTORS:
James J. Jones,
Solomon H. Dwight.
per Charles P. Housum
THEIR ATTORNEY.

128,888

UNITED STATES PATENT OFFICE.

JAMES J. JONES AND SOLOMON H. DWIGHT, OF DECATUR, ILLINOIS.

IMPROVEMENT IN CORN-PLANTERS.

Specification forming part of Letters Patent No. 128,888, dated July 9, 1872.

Specification describing certain Improvements in Marker for Corn-Planters, invented by JAMES J. JONES and SOLOMON H. DWIGHT, of Decatur in the county of Macon and State of Illinois.

Our invention relates to an improvement in corn-planters, obviating the marking off of the field previous to planting; and consists in the use of boxes attached to the frame-work that supports the seed-boxes and furrow-shares, said boxes to be filled with lime, plaster, dry wood-ashes, or some substance different in color from the ground. A suitable device is placed in the box and attached to the connecting-bar that operates the seed-dropping mechanism, so that when the seed is dropped in the ground a small quantity of the lime, plaster, or wood-ashes is dropped, leaving a spot or mark on the ground, said spots or marks, serving as guides in planting subsequent rows in check.

Figure 1 is a plan of the seeding part of a corn-planter and embodies our invention. Fig. 2 is a front elevation of the same. Fig. 3 is a plan of box and dropping apparatus; Fig. 4, a section taken through the dotted lines $x\ x$, Fig. 3; Fig. 5, a side elevation of Fig. 1; and Fig. 6, a plan of connecting-rod.

A is the transverse beam of the frame that supports the seed-boxes B B and furrow-shares C C of a corn-planter, which is constructed in the usual manner. D D are boxes to contain the lime, plaster, wood-ashes, or other substance for marking. The boxes are provided with the piece E, by which the box is attached to the transverse beam A with bolts $e'\ e'$, which also pass through the brace O. $e\ e$ are slots in the piece E, so that the boxes can be set forward or back, as in planting the first few hills of corn. If the marking substance does not reach the ground opposite the corn (when there is a difference in the height from which they are dropped) the box can be placed so that the corn and marking substance shall fall on the ground at the same time in a line or check. F is a rod passing through the piece E and into the bottom of the box. To this rod is attached the triangular-shaped slide G, provided with two cells, $g\ g$. H is a piece fastened to the side of the box, so placed that, when the slide G passes under it, it scrapes all of the marking substance off of the slide, leaving the hole $g$ full of the substance. In the bottom of the box is an opening, $d$, through which the substance falls to the ground. At the upper end of the rod F is a crank, K. I is a rod connecting the crank with the connecting-bar J, that operates the seed-dropping mechanism. Said connecting-bar is operated with the lever L in the usual manner. The crank is provided with a number of holes to regulate the "throw" of the slide.

After the first two rows are planted one of the connecting-rods I can be removed, (at the option of the driver,) as a mark on one side of the planter will be sufficient for a guide.

In different corn-planters other connecting arrangements may be made to fasten the piece E to the transverse beam or frame A, and also to connect the crank to the connecting-bar that operates the seed-slides.

This marking attachment can be attached to any corn-planter.

We claim as our invention—

1. The combination of the box D with the opening $d$, piece H, slide G with the cells $g\ g$, rod F, and crank K, or analogous devices, with the connecting-rod I that operates the seed-dropping mechanism of a corn-planter, said box D to contain lime, plaster, or other substance different in color from the ground, and dropping the same simultaneously with the corn, so as to serve as a guide in planting subsequent rows in check.

2. The piece E, slots $e\ e$, and bolts $e'\ e'$, to regulate the dropping substance opposite the hills of corn, substantially as shown and described.

JAMES J. JONES.
SOLOMON H. DWIGHT.

Witnesses:
CHARLES P. HOUSUM,
ABRAM DARE.